United States Patent
Hawn et al.

(10) Patent No.: US 8,332,257 B2
(45) Date of Patent: Dec. 11, 2012

(54) BEHAVIOR MAPPED INFLUENCE ANALYSIS TOOL WITH COACHING

(75) Inventors: Mark K. Hawn, Atlanta, GA (US);
Henry E. McIntosh, Atlanta, GA (US);
Laurie L. Johnson, Potomac Falls, VA (US)

(73) Assignee: Accenture Global Services Limited, Dublin (IE)

( * ) Notice: Subject to any disclaimer, the term of this patent is extended or adjusted under 35 U.S.C. 154(b) by 358 days.

(21) Appl. No.: 12/686,160

(22) Filed: Jan. 12, 2010

(65) Prior Publication Data
US 2010/0223109 A1 Sep. 2, 2010

Related U.S. Application Data

(63) Continuation-in-part of application No. 12/478,546, filed on Jun. 4, 2009, now Pat. No. 8,224,684.

(60) Provisional application No. 61/144,636, filed on Jan. 14, 2009, provisional application No. 61/184,210, filed on Jun. 4, 2009.

(51) Int. Cl.
*G06F 10/00* (2006.01)
(52) U.S. Cl. ............ 705/7.29; 705/7.32; 705/7.36
(58) Field of Classification Search .......... 705/7.29, 705/7.32, 7.36
See application file for complete search history.

(56) References Cited

U.S. PATENT DOCUMENTS

| | | | | |
|---|---|---|---|---|
| 5,832,494 A * | 11/1998 | Egger et al. | ............ | 707/999.005 |
| 6,629,097 B1 * | 9/2003 | Keith | ................. | 1/1 |
| 7,840,604 B2 * | 11/2010 | Zhu et al. | ............. | 707/802 |
| 8,095,492 B2 * | 1/2012 | Cohen | ................ | 706/47 |
| 2003/0023685 A1 * | 1/2003 | Cousins et al. | ........ | 709/205 |
| 2003/0216942 A1 * | 11/2003 | Hawks | ............. | 705/2 |
| 2005/0075922 A1 * | 4/2005 | Brady et al. | ........ | 705/10 |
| 2007/0067210 A1 * | 3/2007 | Rishell et al. | ........ | 705/10 |
| 2007/0150302 A1 * | 6/2007 | McCall et al. | ........ | 705/1 |
| 2008/0183525 A1 * | 7/2008 | Tsuji et al. | ......... | 705/7 |
| 2008/0208644 A1 * | 8/2008 | Gray et al. | .......... | 705/7 |

OTHER PUBLICATIONS

Cross-Cutting Tool Stakeholder Analysis. Resources for Implementing the WWF Standards. Oct. 2005.*
Varvasovszky, Zsuzsa and Brugha, Ruairi. How to do (or not to do) . . . A stakeholder analysis. Health Policy and Planning; 15(3): 338-345. Oxford University Press 2000.*
Rizwan's Blog: a Practical Approach to Stakeholder Analysis. from http://consultingblogs.emc.com/rizwantayabali/archive/2006/10/12/A-Practical-Approach-to-Stakeholder-Analysis.*
Manktelow, Rachel. Stakeholder Management—winning support for your projects. From www.mindtools.com archived at http://web.archive.org/web/20030129092720 dated Jan. 29, 2003.*
Ramirez, Ricardo. Cultivating Peace. Conflict and Collaboration in Natural Resource Management. IDRC/World Bank 1999. Chapter 5: Stakeholder Analysis and conflict management.*

(Continued)

*Primary Examiner* — Johnna Loftis
(74) *Attorney, Agent, or Firm* — Brinks Hofer Gilson & Lione

(57) ABSTRACT

An analysis tool guides the selection of an external agent who will interact with a selected organizational actor. The analysis tool helps to minimize mismatches in personality and behavior between the external agents and actors in the business. The analysis tool also coaches deal external agents on how to successfully interact with the selected organizational actor. As a result, there are fewer misunderstandings about project scope and requirements, there is better communication between individuals, and valuable deals are more frequently closed.

21 Claims, 7 Drawing Sheets

OTHER PUBLICATIONS

Walker, Derek; Shelley, Arthur; and Bourne, Lynda. Influence, Stakeholder Mapping and Visualisation. From www.stakeholder-management.com copyright 2008.*

Fisch, Jill E. Measuring Efficiency in Corporate Law: The Role of Shareholder Primacy. Journal of Corporation Law v31n3 pp. 637-674 Spring 2006.*

Also known as: Social Network Analysis. Influence Mapping. from www.mindtools.com archived and accessed from web.archive.org Nov. 19, 2008.*

Brugha, Ruairi and Varvasovszky, Zsuzsa Stakeholder analysis: a review. Health Policy and Planning; 15(3):239-246. Oxford University Press 2000.*

Power Mapping: A Tool for Utilizing Networks, pp. 1-8, undated.

Eva Schiffer, The Power Mapping Tool: A Method for the Empirical Research of Power Relations, International Food Policy Research Institute, 33pgs., May 2007.

Social Style—The World's Best Personal Effectiveness Model, Tracom Group, 2pp., Dec. 2008.

The Four Social STYLEs$^{sm}$, Tracom Group, 2pp., Dec. 2008.

Power Mapping: A Tool for Utilizing Networks and Relationships, Center for International Media Action, 8pgs., http:www.idealist.org/ioc/learn/curriculum/pdf/PowerMapping.pdf., Feb. 22, 2005.

* cited by examiner

BEHAVIOR MAPPED INFLUENCE ANALYSIS TOOL WITH COACHING

CROSS REFERENCE TO RELATED APPLICATIONS

This application claims the priority benefit of U.S. Provisional Application Ser. No. 61/144,636, filed Jan. 14, 2009 and U.S. Provisional Application Ser. No. 61/184,210, filed Jun. 4, 2009. This application is a Continuation in Part Application of application Ser. No. 12/478,546, filed Jun. 4, 2009. Each of the applications noted above is incorporated herein by reference in its entirety.

BACKGROUND OF THE INVENTION

1. Technical Field

This disclosure relates to analyzing and leveraging the influence and behavior of actors within an organization, particularly as it relates to understanding, preparing for and influencing an organization's decision, selecting the most effective external agents to engage the actors and coaching those external agents in behaviors to which the actors will be open.

2. Related Art

Modern organizations interact extensively with independent external agents. One example of such an external agent is a consulting company that assembles a deal team to work with the organization to propose, plan, and (ideally) win and implement a project. Regardless of the role that the external agents play, there is typically extensive interaction between many external agents and many actors from the organization. The interaction continues throughout the lifetime of a deal as the external agent and the organization work all aspects of the deal toward a mutually agreeable conclusion.

In the past, little guidance was available to help determine which deal team member or other external agent should interact with or build a relationship with specific actors in the organization and the best behavior that can help do that. Choosing the wrong external agent often led to an inability to effectively communicate with the right actors who influence other organizational actors in making decisions, misunderstandings about project scope and requirements, and, ultimately, failure to close and/or complete delivery of valuable deals. Therefore, a need exists to address the problems noted above and others previously experienced.

SUMMARY

An analysis tool helps determine which external agent should interact with which actor in the organization and understand which actor influences which actor and in what way. The analysis tool helps to understand and leverage the influence relationships that exist in the organization and to use that understanding to minimize mismatches in behavior between the external agents and the organizational actors. As a result, there are fewer misunderstandings about project scope and requirements, there is better communication between individuals, and valuable deals are more frequently closed and/or brought to a mutually agreeable conclusion.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The systems and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
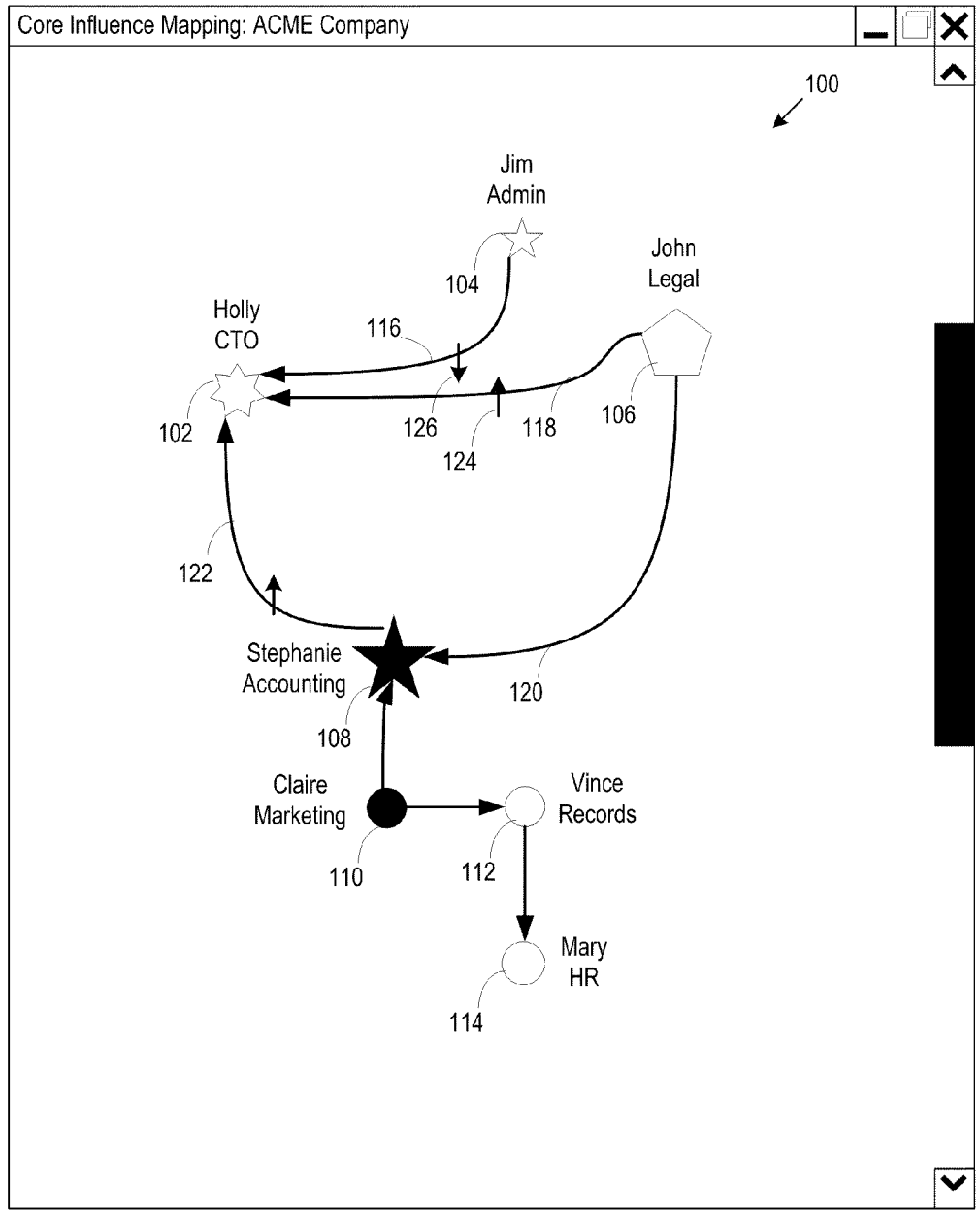
FIG. 1 shows a core influence mapping that helps to illustrate how organizational actors influence one another.

FIG. 1 shows a core influence mapping 100 that shows how organizational actors influence one another. In the example shown in FIG. 1, the core influence mapping 100 includes Holly as the chief technology officer (CTO) 102. The core influence mapping 100 also shows that within the organization, Jim works in an administrative position 104, John works in a legal position 106, and Stephanie works an accounting position 108. Furthermore, Claire works in a marketing position 110, Vince works in the records department 112, and Mary works in the human resources (HR) Department 114.

The individuals identified in FIG. 1 are examples of actors within an organization. The actors may assume virtually any role related to a specific deal, such as approver, recommender, or influencer, and may fill virtually any position in the organization, from chief executive officer to part-time project assistant. Symbols of various shapes, sizes, and designs may be used to distinguish between positions, importance, decision-making authority, or other characteristics of the roles of actors within the company.

The core influence mapping 100 further shows how the actors in the organization influence one another. More specifically, the core influence mapping 100 includes actor influence specifiers selectively connecting the actors to show how one actor influence as another, if at all. For example, the arc 116 shows that Jim directly influences Holly's decisions. FIG. 1 also shows that John has two paths of influence to Holly: first, directly to Holly as shown by the arc 118, and second, and indirectly to Holly through Stephanie, as shown by the arcs 120 and 122. Actor influence specifiers of various shapes, sizes, and designs may be used to distinguish various levels or strengths of influence between actors in the organization.

Figure 7:
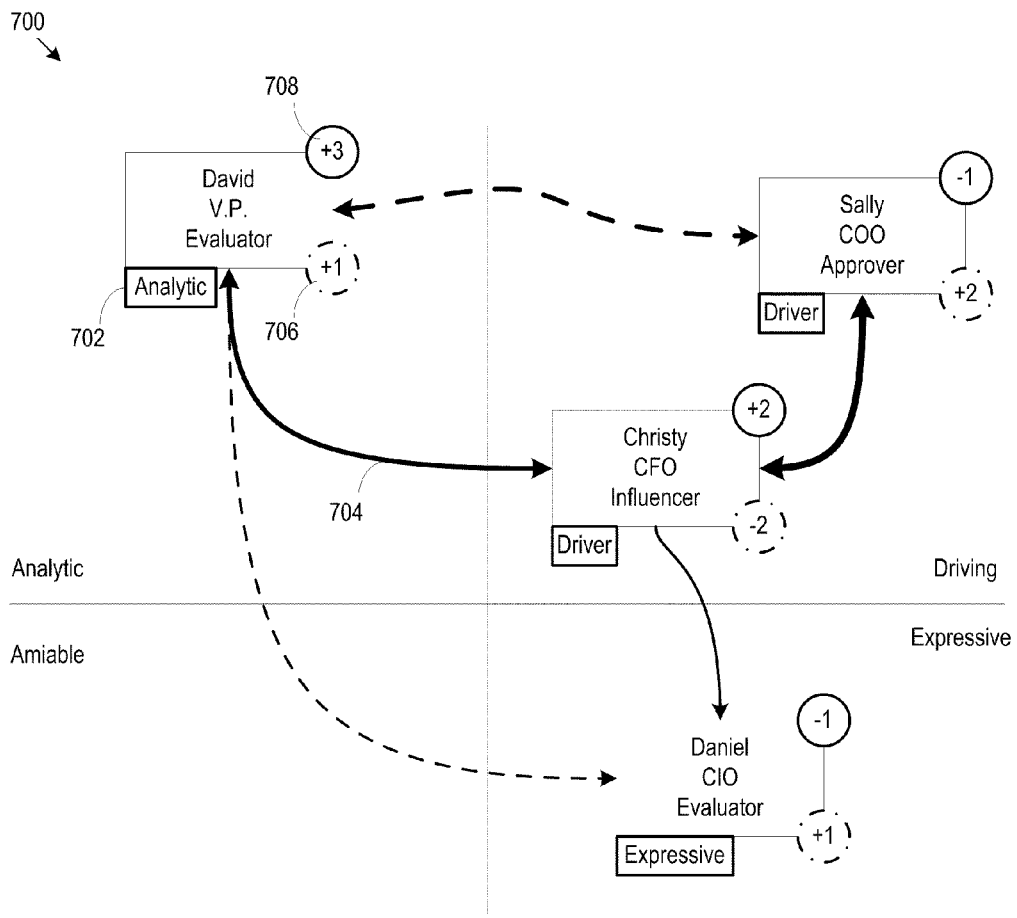
FIG. 7 shows a behavior influence mapping.

Additionally, directional indicators may be used to note if an influence is a positive, negative, or neutral influence. Negative influences may arise because, as examples, two people simply do not like each other, because an organizational actor does not like the external agent, or for other reasons. FIG. 1 shows an example of a positive internal directional indicator 124 and a negative internal directional indicator 126. The internal indicators illustrate positive, negative, or neutral influence between organizational actors. FIG. 7, described below, gives further examples, as well as examples of another type of directional indicator: an external directional indicator. The external directional indicator captures positive, negative, or neutral influence between organizational actors and an external agent (e.g., Consulting Corp. or Dave Smith of Consulting Corp.) or a competitor to the external agent. For example, Claire may have a positive relationship with Consulting Corp, making her a more attractive target to match with an external agent from Consulting Corp. for ultimately influencing Stephanie. The tool described below may take directional indicators into account when selecting a compatible external agent to interact with an organizational actor. It is noted that an external agent may not only refer to a company (e.g., Consulting Corp.), but also may refer to individuals (e.g., specific employees of Consulting Corp.) or other entities that may work with the organization.

The core influence mapping 100 helps to identify the actors within an organization and understand how the actors influence one another. The core influence mapping 100 may, of course, be adapted to map any selected organization and any selected actors within the selected organization. However, the core influence mapping 100 does not help determine which external agents should interact with the actors in the organization. Accordingly, the behavior mapped influence analysis tool ("tool"), described in more detail below, transforms the core influence mapping 100 into a behavior influence mapping 200 which does effectively assist with determining which external agents should interact with the organizational actors.

Figure 2:
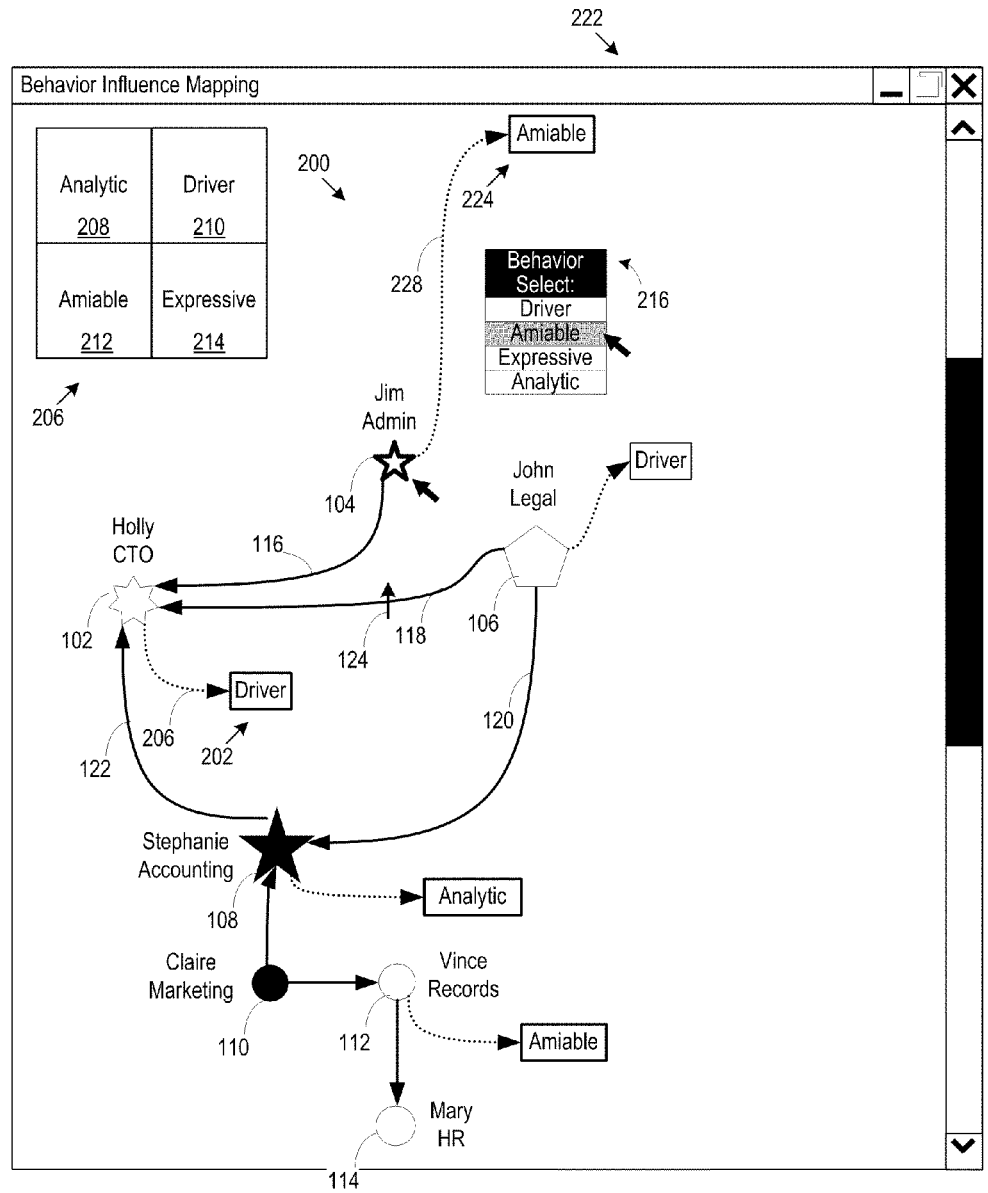
FIG. 2 shows a behavior influence mapping created by transforming the core influence mapping by adding actor behavior specifiers connected to the actors by behavior links.

FIG. 2 shows a behavior influence mapping 200 that the tool creates by transforming the core influence mapping 100. More specifically, the tool adds actor behavior specifiers connected to the actors by behavior links. As one example, the behavior influence mapping 200 includes the behavior specifier 202 linked to Holly using the behavior link 206. The behavior specifier 202, in this example, specifies a Driver' behavior for Holly.

The behavior specifiers may indicate any predetermined selection of behavioral type. In one implementation, the permissible behavioral types are those present in the behavior model 206. The behavior model 206 includes an 'Analytic' behavior 208, which indicates fact driven and logical analysis; 'Driver' behavior 210, which indicates a result oriented practical approach to problems; 'Amiable' behavior 212, which indicates relationship oriented behavior; and 'Expressive' behavior 214, which indicates a spontaneous and impulsive type of behavior. The permissible behavior types may thereby be determined according to and follow the Social Style Model™ representation of behavior in the suite of products and services available from the TRACOM Group™ company. However, the behavior model 206 may instead employ any other framework for identifying behavior. An example of a suitable framework is a behavioral analysis framework that aids people to better understand and work with others, for example by identifying, classifying, or understanding decision-making and control needs and identifying the behavior that people exhibit when interacting with others.

The arrangement of behaviors in the behavior model 206 helps to reveal whether certain types of behaviors are suited to interacting with other types of behaviors. Often, opposite behaviors are not good matches for interaction. Thus, for example, a person exhibiting analytic behavior tends to be a poor match for someone exhibiting expressive behavior. However, individuals exhibiting the same behavior tend to be well matched and are preferential choices for building relationships. Finally, individuals with adjacent behaviors are typically able to interact in a productive or otherwise successful manner. Thus, for example, a first person exhibiting amiable behavior is typically able to successfully interact with a second person exhibiting analytic or expressive behavior. However, the determination to match people with adjacent behaviors may be a secondary or subordinate choice compared to matching people with the same behavior. Though there may be differences in behavior, versatility (described in detail below) can sometimes overcome those differences. In other words, versatile behavior diverse individuals can in many cases successfully work together.

The tool assists with the generation of the behavior influence mapping 200. To that end, the tool may initial generate a user interface 222 that initially displays a rendering of the core influence mapping 100. The tool may then accept operator input to tag any selected organizational actor with a behavior.

In the example shown in FIG. 2, the operator has provided a selection input (e.g., a mouse click, voice command, keystroke, or other input) specifying Jim as the selected actor to tag with behavior information. In response to the selection input, the behavior influence mapping tool displays a behavior list 216. The tool populates the behavior list 216 with the permissible behavior tags for the selected actor. The operator selects a permissible behavior tag for the selected actor from the behavior list 216. The list 216 may be a drop-down list, radio button set, text entry box, or any other type of selection or data entry mechanism.

Continuing the example, in response to operator behavior selections from the list 216, the tool has tagged Jim with 'Amiable' behavior by creating the behavior specifier 224. The behavior influence mapping tool also creates the behavior link 228 to connect Jim with the behavior specifier 224. The behavior links may be implemented in many different ways, such as a pointer from (or to) a record containing previously stored information (e.g., identifier and influence specifiers) about a selected actor to (or from) a record containing the behavior and versatility specifiers. As another example, the behavior link may be formed by storing behavior specifiers in a database record containing the previously stored information about the selected actor.

FIG. 7 shows a second example of a behavior influence mapping 700 that the tool may create by transforming a core influence mapping. The organizational actors in FIG. 7 are tagged with Name (e.g., David, Sally), Role in organization (e.g., Vice President, COO), and Role in project decision (e.g., Evaluator, Approver, Influencer). FIG. 7 shows, among others, a behavior specifier 702 of "Analytic" for David and a positive internal directional indicator 704 between David and Christy. FIG. 7 also shows an external directional indicator 706 for the external agent's competitor, and an external directional indicator 708 for the external agent (e.g., Consulting Corp.).

Thus, the mapping 700 tracks multiple types of influences that the tool may analyze when determining a compatible external agent to select for interaction with an organizational actor. Suppose, for example that Sally needs to be influenced because of her role as an Approver. Sally has a −1 external directional indicator toward the external agent and a +2 external directional indicator toward the external agent's competitor. Therefore, it may be difficult to directly influence Sally in favor of Consulting Corp. However, David has a +3 external directional indicator toward the external agent and a positive internal indicator toward Christy, who in turn can strongly influence Sally. Therefore, David may be a good choice for assignment to a specific compatible person from the external agent in an attempt to influence Sally, through Christy, in favor of the external agent.

In addition to determining a compatible external agent for any given organizational actor, the tool may also analyze the behavior influence mapping, including the external directional indicators, to assist in determining which organizational actor to target for a match to a given external agent. For example, the tool may first look for organizational actors to match who have the most positive external directional indicators, or the least negative competitor external directional indicators. The tool may further search the behavior influence mapping to find who has positive internal relationship paths to an ultimate decision maker that needs to be influenced (e.g., an organizational actor with an Approver role). Graph searching or other algorithms may perform this analysis, with the organizational actors and their roles forming nodes in the graph, and the internal directional indicators forming edges between nodes, with elements of the graph weighted by the strength of internal or external directional indicators.

With regard to determining compatibility with an external agent, the tool may increase or decrease compatibility in relation to increased or decreased external directional indicator strength for the external agent. The tool may further increase or decrease compatibility in relation to decreased or increased external directional indicator strength for the competitor. In other words, the tool may give preference to matches to those organizational actors who view the external agent most favorably, and/or who view the competitor least favorably. However, the tool may also match an external agent to an organizational actor who is not favorable toward the external agent. The tool may make such a match when it is important to focus on organizational actors who need to be persuaded, in contrast to those who already value the organization actor or their offer.

Figure 3:
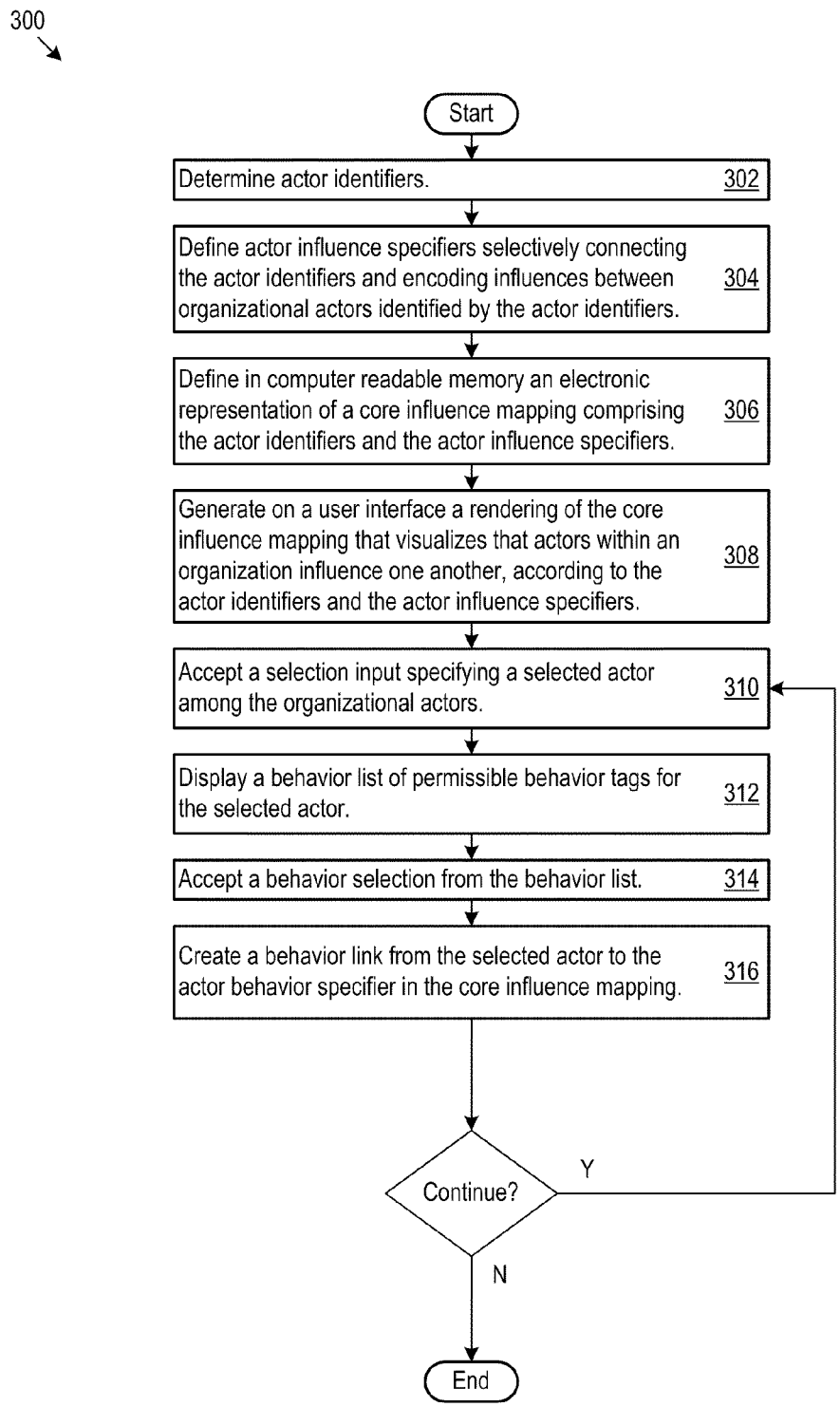
FIG. 3 shows logic that a mapping program may implement to visualize core influence mappings, accept actor behavior specifiers, and transform a core influence mapping into a behavior influence mapping.

FIG. 3 shows logic 300 that a mapping program in the tool may implement to visualize core influence mappings, accept actor behavior specifiers, and transform a core influence mapping into a behavior influence mapping. The mapping program defines or determines already selected actor identifiers (302). The actor identifiers may be, for example, unique numeric, alphabetic, or alphanumeric strings (e.g., "Holly—CTO") that specify individuals within an organization. The mapping program also defines or determines already established actor influence specifiers selectively connecting the actor identifiers and that encode influences between organizational actors identified by the actor identifiers (304). In FIG. 1, for example, the arc 116 is a type of actor influence specifier that shows that Jim influences Holly. The actor influence specifiers may take other forms, such as a list of actor identifiers, where each of the actor identifiers specifies an actor that a certain person can influence.

The mapping program also defines in computer readable memory an electronic representation of the core influence mapping (306). In other words, the mapping tool stores a representation of the core influence mapping 100 in memory. The data for the representation stored in memory may include the actor identifiers, the actor influence specifiers, or other data that encodes entities or relationships in the core influence mapping 100. The mapping program generates on a user interface a rendering of the core influence mapping 100 (308). As shown in FIG. 1, the core influence mapping 100 visualizes that actors within an organization influence one another, according to the actor identifiers and the actor influence specifiers.

The mapping program transforms the core influence mapping 100 into a behavior influence mapping 200 by tagging actors with behaviors. In that regard, the mapping program accepts a selection input specifying a selected actor among the organizational actors (310), displays a behavior list 216 of permissible behavior tags for the selected actor (312), and accepts a behavior selection from the behavior list 216 (314). The mapping program then creates an actor behavior specifier for the behavior selection in the core influence mapping 100. The mapping program creates a behavior link (e.g., 228) from the selected actor to the actor behavior specifier in the behavior influence mapping (316), thereby transforming the core influence mapping 100 into a behavior influence mapping 200.

The tool also helps to find suitable external agents to interact with actors within an organization. The tool may analyze the structure of the behavior model 206 as part of a compatibility analysis to determine external agents who would be compatible with any given organizational actor. One implementation of the compatibility analysis operates under the following analysis rules: 1) individuals exhibiting opposite behaviors (e.g., Analytic<->Expressive) should be rejected as matches; 2) individuals exhibiting the same behavior are preferred as highly compatible matches; and 3) individuals with adjacent behaviors (e.g., Amiable<->Expressive) are compatible, but less preferred than matches with the same behavior.

Examples of additional rules include: 4) if an external agent has a negative internal directional indicator for influence toward an organizational actor, then reject the external agent as a match, regardless of behavior; 5) if an external agent has a positive internal directional indicator for influence toward an organizational actor, then increase the determined level of compatibility between the external agent and the organizational actor (e.g., by increasing a compatibility score by a pre-determined amount); 6) increase the determined level of compatibility in relation to the strength of the external directional indicator for the external agent; and 7) decrease the level of compatibility in relation to the strength of the external directional indicator for the competitor of the external agent.

In some implementations, the tool considers versatility when determining which external agents are compatible with any selected organizational actor. Versatility may reflect ability or skillfulness in adapting to many different people in many different situations. Versatility is one indication that the external agent and the organizational actor may effectively build a relationship. Versatility may be measured by a versatility score or ranking, such as a numerical or alphabetic ranking. The versatility score for an external agent may be generated by analysis and processing of questions (e.g., behavioral analysis questions) given to, and answers given by, selected individuals who were chosen to answer the questions about the external agent. When the organizational actor is not among the selected individuals, the versatility score may not turn out to be absolutely correct with respect to the organizational actor, but the versatility score nevertheless may serve as a starting point for understanding versatility with respect to the organizational actor and as a reasonable basis for making compatibility decisions based in part on versatility. As one specific example, the versatility of an external agent may be scored in terms of how others see the eternal agent managing their tension level in the relationship on a four level scale from low versatility to high versatility. In one implementation, the following factors may compose the versatility score: Image, 8% of total versatility score, measuring how the individual dresses and how they carry themselves; Presentation, 9% of versatility score, measuring how well an individual communicates and presents; Competence, 48% of versatility score, measuring dependability, perseverance, and flexibility; and Feedback, 35% of versatility score, measuring the ability to understand others rationally and emotionally.

Referring back to FIG. 2, Holly is a Driver. Assume that a first available external agent, Dan, is an Analytic, and that a second available external agent, Darren, is an Expressive. There is therefore already some level of compatibility between Holly and Dan and between Holly and Darren because their behaviors are adjacent in the behavior model 206. Assume also that Dan is versatile in terms of behavioral compatibility. The tool may take the versatility into consideration by increasing the assessed level of compatibility determined between Dan and Holly, or by making Dan a more preferred match than Darren.

Sufficient versatility may also reveal that otherwise behavior diverse individuals could be compatible and build relationships. Assume that Doug is an available external agent who is Amiable, opposite that of Holly. Ordinarily, the tool would indicate that Doug and Holly should not be matched. However, assume that Doug is versatile and that testing has determined a versatility score or level of 3. The versatility may make Doug a workable match. For example, if Doug's versatility score exceeded a matching threshold (e.g., level 3 versatility or above), then the tool may recommend matching Doug and Holly, but may further indicate that Doug is a less preferred match than Dan or Darren due to the fundamental opposing behavior of Doug and Holly.

The level of compatibility may be expressed in many different ways, both abstract (e.g., low, medium, high) and concrete (e.g., a numerical score). For example, a scoring model may assign an external agent with a matching behavior a compatibility score of 20, and may assign an external agent with an adjacent behavior a compatibility score of 10. The scoring model may also reward external agent versatility by increasing the compatibility score according to the strength of that versatility (e.g., level 1: increase 1 point, level 2: increase 4 points, level 3: increase 6 points, level 4: increase 8 points).

The scoring model may also assign a base compatibility score of 0 (zero) to an external agent with opposing behavior to a selected organizational actor. The tool may increase the base compatibility score as a function of the external agent versatility score (e.g., level 1: increase by 1, level 2: increase by 2, level 3: increase by 5, level 4: increase by 8). Thus, as the external agent exhibits greater versatility, the tool may further increase the compatibility score. The tool may cap the resulting compatibility score below the other scores explained above, to indicate that such a match is not preferred, but might be attempted in the right situations (e.g., no other external agent is available).

Figure 4:
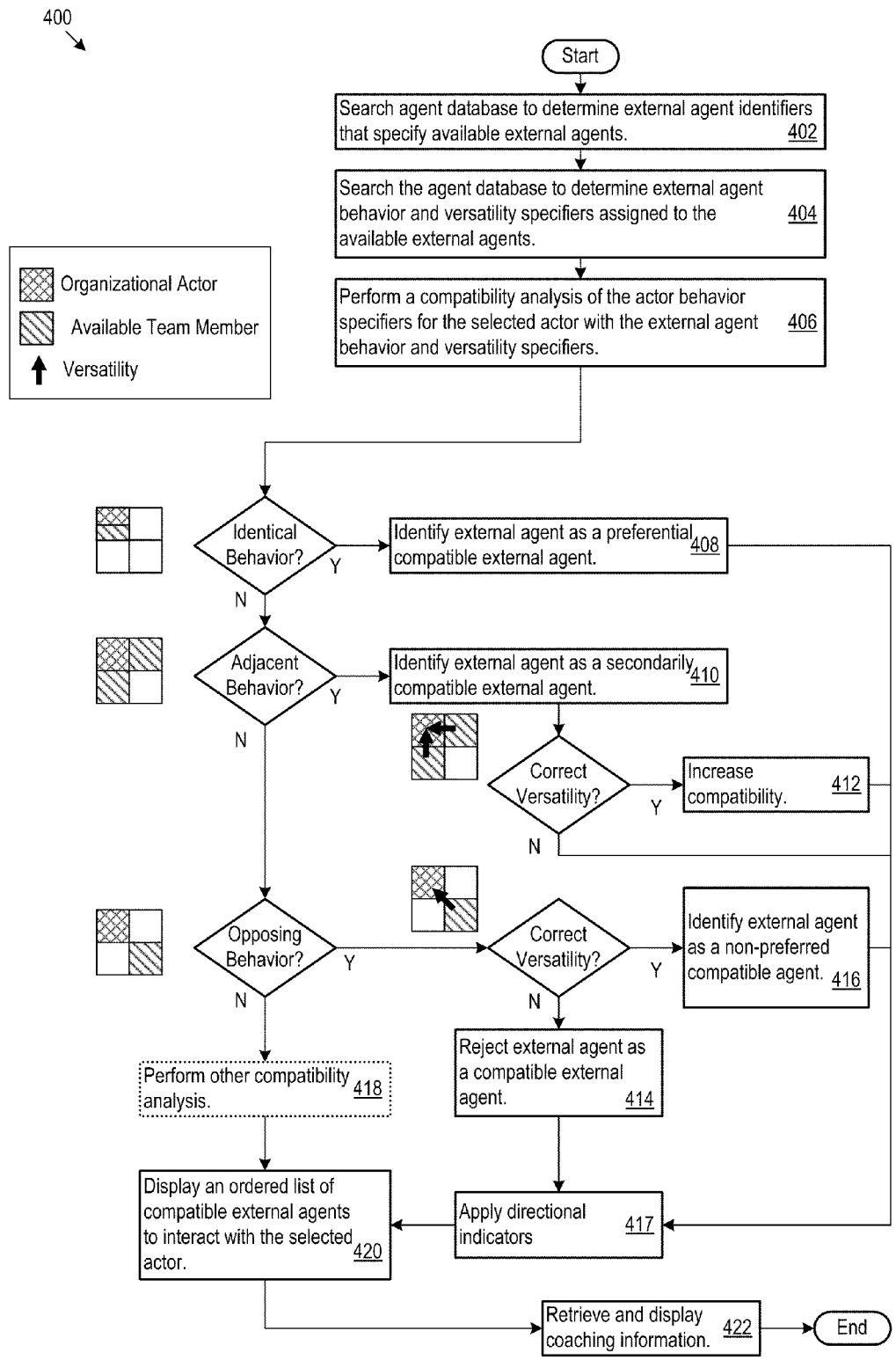
FIG. 4 shows logic that an agent search program may implement to identify compatible external agents to interact with organizational actors.

An agent search program executing in the tool may implement the compatibility analysis rules explained above. In particular, FIG. 4 shows logic 400 that the agent search program may implement to identify compatible external agents to interact with a selected organizational actor. The agent search program searches an agent database to determine external agent identifiers that specify available external agents (402). The agent search program also searches the agent database to determine external agent behavior and versatility specifiers assigned to the available external agents (404). The agent database may be preconfigured to include the agent identifiers, behaviors, and versatility specifiers for any particular external agents or specific deal teams of external agents assembled to work with any particular organization.

The agent search program initiates a compatibility analysis of the actor behavior specifier for the selected actor with the external agent member behavior and versatility specifiers (406). In particular, the agent search program determines whether any external agents have identical behavior compared with any selected actor in the organization. If so, the agent search program identifies the external agent as a preferred compatible external agent (408). As explained above, the agent search program may assign a compatibility score indicative of the level of compatibility found between the external agents and the selected actor.

Continuing the analysis, the agent search program may also determine whether any external agents have behavior that is adjacent to the behavior of the selected actor. If so, those external agents may be identified as secondarily compatible external agents (410). Furthermore, if either the external agent has versatility, then the agent search program may increase the level of compatibility found for the external agent and the selected actor (412).

It may also be the case that the external agent has opposing behavior to the selected actor. Opposing behavior may result in immediately rejecting the external agent as non-compatible (414). However, in some implementations of the tool, when the external agent has versatility, then the agent search program may identify the external agent as a compatible (though possibly non-preferred) selection to interact with the selected actor (416).

Furthermore, the agent search program may analyze external and internal influence directional indicators and apply them to the analysis of whether an external agent is compatible (417) (or which organizational actor to select to influence). For example, the agent search program may apply the analysis rules 4), 5), 6), and 7) noted above. Accordingly, even when an external agent has compatible behavior with respect to an organizational actor, the agent search program may nevertheless reject the external agent as a compatible external agent, when the direction of influence is negative or adverse between the external agent and the organizational actor. On the other hand, the agent search program may further increase the level of determined compatibility when the direction of influence is positive. As another example, the agent search program may attempt to match external agents to those organizational actors with the most positive external indicators, the least negative competitor external indicators, or any combination thereof.

The analysis described above is well suited for the behavior model 206. The behavior model 206 may be further subdivided into more finely grained behaviors. For example, each behavior may be subdivided into four subcategories of behavior, determined by the underlying analysis factors gathered when the behavior analysis was performed. However, any other behavior analysis on any other behavior model 206 may be implemented and analyzed instead (418), and may give rise to additional, fewer, or different behavior compatibility rules.

Once the agent search program has completed the analysis, the agent search program may display a list (e.g., a score ranked list) of compatible external agents to interact with the selected actor (420). The compatibility scores assigned to the external agents may also be displayed with each compatible external agent. The agent search program may also display those external agents who were rejected as incompatible because of opposing behavior, unavailability, or for other reasons.

In addition, the agent search program may retrieve and display coaching information (422). To that end, the agent search program may search a coaching database as described in detail below to locate coaching information relevant to the selected organizational actor, relevant to the compatible external agent behavior, or both. The agent search program may display the coaching information on a user interface to provide helpful information about how to interact with individuals who have specific behaviors.

Figure 5:
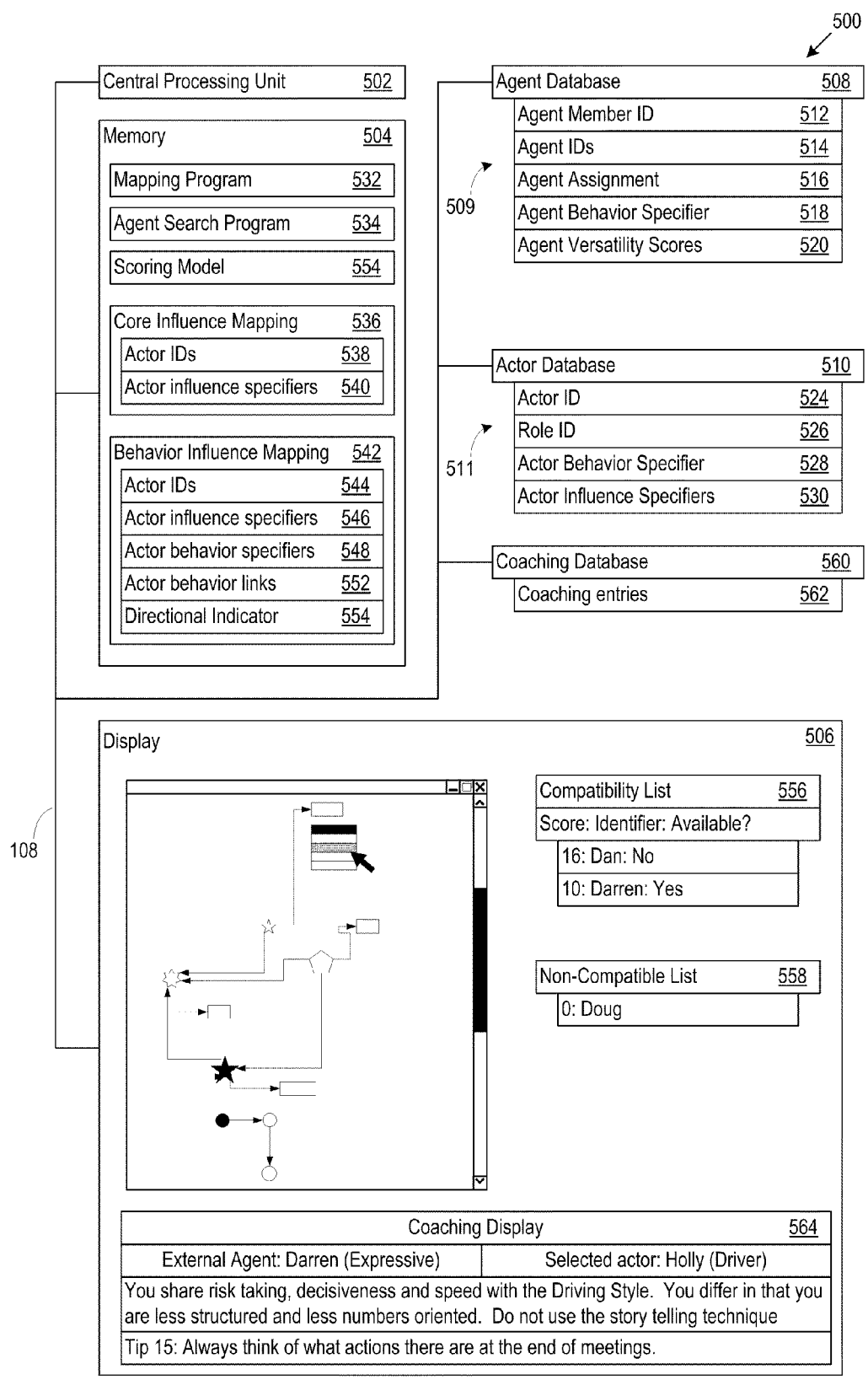
FIG. 5 shows a behavior mapped influence analysis tool.

FIG. 5 shows one example of a particular machine that implements a behavior mapped influence analysis tool 500 ("tool 500"). The tool 500 includes a processor 502, a memory 504, and a display 506. The tool 500 also includes an agent database 508 and an actor database 510. The agent database 508 stores sets of records that characterize the external agents. To that end, the agent database 508 may store an agent record 509 for each external agent including, as examples, the fields described below in Table 1.

TABLE 1

| Field | Description |
| --- | --- |
| Agent Member ID (512) | An identifier of the external agent, e.g., a name or employee number |
| Deal Team IDs (514) | An identifier of one or more specific deal teams that the external agent belongs to, e.g., ACME Company Network Consulting Deal |
| Agent Member Assignment (516) | An indicator of whether the external agent is available to be assigned, or is already assigned to another task |
| External Agent Behavior Specifier (518) | An identifier of the external agent's behavior, e.g., Analytic |
| External Agent Versatility Score (520) | The external agent's versatility score or level, e.g., 'level 3', 'Z', 'Strong', or 75 |

The actor database 510 stores sets of records that define the actors within the organization being targeted by the deal team. The actor database 510 may store an actor record 511 for each actor including, as examples, the fields described below in Table 2.

TABLE 2

| Field | Description |
| --- | --- |
| Actor ID (524) | An identifier of the organizational actor, e.g., a name or employee number |
| Role ID (526) | An identifier of the role played within the organization by the actor, e.g., CTO. |
| Actor Member Behavior Specifier (528) | An identifier of the actor's behavior, e.g., Amiable |
| Actor Influence Specifiers (530) | Specifiers of which other actors within the organization this actor can influence, e.g., Holly and Jim). |

The databases 508 and 510 may be implemented in many different ways and may include additional, fewer, or different fields depending upon the particular design of the tool 500, the behavior model, and the rules for determining compatible behaviors.

The processor 502 executes the program instructions of the mapping program 532 and the agent search program 534. The program instructions of the agent search program 534 may implement the logic described with respect to FIG. 4. The agent search program 534 may follow any desired scoring model 554, such as the scoring model described above, to determine compatibility scores for external agents. The agent search program 534 may display compatible external agents and non-compatible external agents on the user interface.

FIG. 5 shows, for example, that the agent search program 534 has generated a compatibility list 556 on the display 506. The compatibility list 556 enumerates compatible external agents in a ranking ordered by compatibility score. The agent search program 534 may also show external agent availability, as determined by evaluation of the External Agent Assignment field 516. FIG. 5 also shows a non-compatibility list 558 displayed to highlight particular external agents (in this case Doug) who should not be selected to interact with the selected organization actor.

The program instructions of the mapping program 532 implement the logic described above with respect to FIG. 3. The mapping program 532 works to transform the core influence mapping representation 536 in the memory 504 into the behavior influence mapping representation 542. The core influence mapping representation 536 includes actor identifiers 538 and actor influence specifiers 540. The actor influence specifiers 540 selectively connect the actor identifiers 538 and encode influences between organizational actors identified by the actor identifiers 538. For example, associating the actor influence specifier 'Holly' with the actor identifier 'Jim' connects Jim to Holly and connotes that Jim can influence Holly.

As described above with reference to FIG. 3, the mapping program 532 generates on a user interface a rendering of the core influence mapping 100. The core influence mapping 100 visualizes that the organizational actors influence one another as encoded by the actor influence specifiers. The mapping program 532 also accepts through the user interface a selection input specifying a selected actor from among the organizational actors. In response, the mapping program 532 displays a behavior list 216 that enumerates permissible behavior tags for the selected actor. The operator chooses a behavior selection, which the mapping program 532 receives and processes.

The mapping program 532 transforms the core influence mapping 100 into the behavior influence mapping 200. More specifically, the mapping program 532 creates an actor behavior specifier 548 for the behavior selection and creates a behavior link 550 from the selected actor to the actor behavior specifier 548 in the core influence mapping. The behavior influence mapping representation 542 stores this information, as well as actor identifiers 544 and actor influence specifiers 546, obtained, for example, from the original core influence mapping representation 536.

Furthermore, the behavior influence mapping 542 may include directional indicators 554 for influence. For example, the directional indicators 554 may encode whether any one or more of the influence specifiers 546 is positive or negative. The agent search program may take the directional indicators 554 into consideration when determining compatible external agents, as noted above in the discussion with respect to FIG. 4.

The tool 500 may further provide coaching strategies tailored to the particular behaviors of compatible external agents and selected actors within an organization. The coaching strategies help to build a relationship that increases the understanding and influence on organizational decisions. To that end, a coaching database 560 stores coaching entries 562. The records that define the coaching entries 562 may include a record number, behavior type, an entry type, and coaching information. The entry type may distinguish between different types of coaching information, such as a 'coaching tip' (e.g., a helpful text message that explains behavior characteristics of any selected organizational actor), and a 'matching strategy' (e.g., specific advice for an external agent with a specific behavior for successfully interacting with an organizational actor with a specific behavior). Examples are given below. The coaching information in the coaching entries 562 may point to or store text, audio, video, or other information that describes or explains characteristics of individuals with certain behaviors, that gives strategies for working with an individual with any particular behavior, and any other desired guidance information for interacting with an individual who exhibits a particular behavior.

Table 3 shows an example of records in the coaching database 560 that store coaching entries 562 for Analytical behavior. The mapping program 532, agent search program 534, or another program (e.g., a separate coaching program) may search the coaching database 560 to find, retrieve, and display appropriate coaching strategies. As one example, the 'tip' number 10 coaches that when working with an organization actor with Analytical behavior, the external agent should "Answer questions with facts, reasons and numbers that are accurate." As another example, coaching entry number 27 provides an example of a behavior 'matching strategy' for working with an individual with Analytical behavior, with respect to any particular external agent behavior. In other words, given an Analytical selected actor, the behavior matching strategy provides guidance for how an external agent with any type of behavior may best interact with the selected actor. As a specific example, when an Amiable external agent is selected to work with an Analytical organizational actor, the tool 500 may retrieve the following 'matching strategy' from the coaching database 560 and display the 'matching strategy' on a local or remote display device for the external agent to review: "An Amiable. You both like to take your time in decision making and want risks mitigated. Analyticals like to get down to business quicker than you and want more structured conversations. They also care less about what others think." Accordingly, the tool 500 may give guidance tailored to any specific external agent behavior for interacting with a selected actor with any type of behavior.

TABLE 3

Analytical Coaching

| Coaching entry number | Entry Type | Coaching information |
|---|---|---|
| 1 | Tip | Basic Need: They want to be right, that is, when making decisions or buying, they want to do so based on facts and figures. They are slow to make up their mind. They are structured and like agendas. They typically do not like to socialize for very long at the beginning of meetings. They like transparency and what to know how we will do things. |
| 2 | Tip | They will be very risk adverse. So, always have messages that mitigate risks. |
| 3 | Tip | They will want their decisions to hold up over time. |
| 4 | Tip | They initially focus on self interest. They are looking to see that you are trying to do things in your interest versus theirs. They will be suspicious of any unproven sales claims or hyperbole. Their BS meters will be sensitive. They are skeptical of storytelling as they see this as self serving. |
| 5 | Tip | They will not be eager to buy big steps, much preferring to buy smaller increments. |
| 6 | Tip | They likely will not respond immediately to suggestions - they need to think and analyze. This can be frustrating for them. |
| 7 | Tip | Do not expect any decision to be made during the meeting and do not pressure in any way. |
| 8 | Tip | Pause and think before answering their questions - do not answer too quickly. |
| 9 | Tip | Answer many questions indirectly. You may start with qualifiers such as "it depends." |
| 10 | Tip | Answer questions with facts, reasons and numbers that are accurate. |
| 11 | Tip | They like detail and process. In presenting, do not start with a summary or conclusions. Show them the process that you have gone through to get to your answers and show the answers at the end. Also do not start with credentials - put this at the very end. |
| 12 | Tip | You can start a presentation by going through the classic "Understanding Your Situation" in order to verify, through interaction that we accurately understand them. |
| 13 | Tip | If we can't answer their questions, do not try to fake it - say that we would like to think about it, gather facts and figures and get back to them. |
| 14 | Tip | Show them how you think - the process that you are using - the alternatives that you are considering with strengths and weaknesses of each. |
| 15 | Tip | They like to develop a business case before moving forward. |
| 16 | Tip | Regarding Deals, they like fixed price with guarantees. They can be suspicious of gain sharing and balanced score carding because they see difficult ties in measuring. |
| 17 | Tip | Do not spend too much time socializing. |
| 18 | Tip | Give them an agenda. |
| 19 | Tip | Show them that you appreciate their orientation towards rigor and detail. |
| 20 | Tip | Do not be salesy or pressure them. |
| 21 | Tip | Show them the detail. |
| 22 | Tip | Be prepared for the double click. |
| 23 | Tip | Be fact-based. |
| 24 | Tip | Give them time to think when asking questions. |
| 25 | Tip | Use open-ended questions when asking for their input. |

TABLE 3-continued

Analytical Coaching

| Coaching entry number | Entry Type | Coaching information |
|---|---|---|
| 26 | Tip | When advising, stress logic and rigor. |
| 27 | Matching Strategy | Analytical Behavior Matching Strategy<br>How to deal with Analyticals if you are:<br>An Analytical. You should do well as you both respect rigor and accuracy and taking the time to make good decisions. You may conflict around who has the right answers and the best analytics.<br>A Driver. You both will want to get down to business and will appreciate structure. However, as a Driving Style, you should slow down and not pressure. You should also give accurate, thoughtful questions. You want to show how risks will be mitigated.<br>An Expressive. You are opposite in every respect. Do not come across as salesy. Do not dissemble or use hyperbole. Do not pressure. Do not tell long stories. Be factual, accurate, provide more detail than you like and be careful of anything that could imply self interest. You want to show how risks will be mitigated.<br>An Amiable. You both like to take your time in decision making and want risks mitigated. Analyticals like to get down to business quicker than you and want more structured conversations. They also care less about what others think. |

Table 4 shows an example of records in the coaching database 560 that store coaching entries 562 for Driver behavior.

TABLE 4

Driver Coaching

| Coaching entry number | Entry Type | Coaching information |
|---|---|---|
| 1 | Tip | Basic Need: They want to win. They are very competitive and see many things as contests. They like control. You will often see them take control of a meeting. They like structure. |
| 2 | Tip | They will take risks. |
| 3 | Tip | Their timeframe is tomorrow. To do lists and action plans conclude many of their meetings. They typically start meetings with little socializing. They do not want us to waste their time. |
| 4 | Tip | They first look at Credibility. They will test this by asking questions which can range from challenging to confrontational. |
| 5 | Tip | They do not mind, and in fact admire, for us challenging them as long as we have credibility. |
| 6 | Tip | Answer questions in a very direct way. Do not first qualify by "It depends." Use high energy words such as absolutely. |
| 7 | Tip | They do not like to be sold to with storytelling, especially if they go on and on. |
| 8 | Tip | They will buy big. They typically do not like to spend much time on assessments and feasibility studies: They want to move on. |
| 9 | Tip | They are very decisive. They make their minds up quickly. During the sales campaign, they may decide on who they want during the first meeting. |
| 10 | Tip | Start presentations with conclusions, summaries or recommendations. Follow with credentials and where we have done it elsewhere. Do not start with Understanding Your Situation. They see this as a waste of time as they already understand their situation. |
| 11 | Tip | They like facts and figures but presented in an easy to understand way. They will selectively probe and test numbers with drill down. |

TABLE 4-continued

Driver Coaching

| Coaching entry number | Entry Type | Coaching information |
|---|---|---|
| 12 | Tip | They do not like big presentation decks. Actually some may not like presentation decks at all. |
| 13 | Tip | In preparing to meet people with the Driving style, think of the 40 40 20 rule. This means spending 40% of your preparation time in thinking of what you want to say or get across, 40% of your time in anticipating questions that you may be asked and 20% of your time in thinking of the questions that you can ask them. They admire good questions to them. |
| 14 | Tip | The Driving styles like options. |
| 15 | Tip | Always think of what actions there are at the end of meetings. |
| 16 | Tip | Do not take notes - this subordinates one. |
| 17 | Tip | They are often unimpressed by having senior people come to see them. They want to see the value from this. |
| 18 | Tip | They like deals that have guarantees, penalties and gain sharing. |
| 19 | Tip | Do not spend too much time socializing. |
| 20 | Tip | Give them an agenda. |
| 21 | Tip | Stay structured. |
| 22 | Tip | Save them time. |
| 23 | Tip | Anticipate their questions. |
| 24 | Tip | Put the A team in front of them. |
| 25 | Tip | Challenge them with good questions. |
| 26 | Tip | Get to the point. |
| 27 | Tip | Do not be afraid to ask challenging questions. |
| 28 | Tip | Provide feedback around results. |
| 29 | Tip | Be fact and logic-based. |
| 30 | Tip | Provide options. |
| 31 | Tip | When advising stress, results. |
| 32 | Matching Strategy | Driver Behavior Matching Strategy How to deal with the Driving Style if you are: A Driving Style: You are alike in every way but you are both competitive which can lead to problems. Possible conflicts occur over who is in control and who is driving. It is important to maintain peer status as a Driving Style dealing with a Driving Style. An Analytical: You both are structured and want to get down to business and are interested in numbers. Remember that the Driver is a risk taker and that you aren't and also that they want to move quicker and bigger. They also want direct answers that do not have to be qualified. An Expressive. You share risk taking, decisiveness and speed with the Driving Style. You differ in that you are less structured and less numbers oriented. Do not use the story telling technique. An Amiable. You are different in every respect. You need to get down to business quickly, answer questions directly, be prepared to answer questions quickly and directly and recognize that the Driving Style wants to move with speed. |

Table 5 shows an example of records in the coaching database 560 that store coaching entries 562 for Expressive behavior.

TABLE 5

Expressive Coaching

| Coaching entry number | Entry Type | Coaching information |
|---|---|---|
| 1 | Tip | Basic Need: Expressives want to be admired. They want recognition. |
| 2 | Tip | Never embarrass an Expressive, especially around others. |
| 3 | Tip | Do not directly challenge as this could lead to embarrassment. |

TABLE 5-continued

Expressive Coaching

| Coaching entry number | Entry Type | Coaching information |
|---|---|---|
| 4 | Tip | In the Trust equation, they first look at Intimacy. They do not mind revealing very personal things such as feelings about others and opinions. |
| 5 | Tip | They are future oriented and creative. They are visionaries and innovators. |
| 6 | Tip | They need empathy. Acknowledge that you have heard and understand their feelings. |
| 7 | Tip | Expressives are risk takers. |
| 8 | Tip | They are very decisive - in fact, impulsive. |
| 9 | Tip | They will quickly change their mind. This means that one should always go last because of this. |
| 10 | Tip | They are assessable and easy to talk with. They like to use multiple vendors because the attention they receive. |
| 11 | Tip | They do not mind us bringing several people at once to see them. They like audiences. Take notes to flatter them. |
| 12 | Tip | They like lots of attention. See them as much as you can. |
| 13 | Tip | A good technique is to ask their opinions. |
| 14 | Tip | They are great coaches, whether they want you to win or not because it is hard for them not to want to tell what's going on. |
| 15 | Tip | Put the "Understanding Your Situation" section at the very front of your presentation and invite their comments. You do this to show that you understand them and let them talk. |
| 16 | Tip | They may ask flashy questions that they hope impress the audience. |
| 17 | Tip | They like flattery. |
| 18 | Tip | They often communicate using story telling many times with stores of accomplishment where they where the hero. Also, they mix in humor in meetings. |
| 19 | Tip | Regarding deals they like balanced scorecards using subjective measures such as customer or user satisfaction. |
| 20 | Tip | Flatter them. |
| 21 | Tip | Ask about their vision. |
| 22 | Tip | Be excited. |
| 23 | Tip | Ask their opinions. |
| 24 | Tip | Listen avidly. |
| 25 | Tip | Empathize. |
| 26 | Tip | Joke. |
| 27 | Tip | Bring in the big dos. |
| 28 | Tip | Point out their achievements. |
| 29 | Tip | Ask them where they could be doing better, versus you telling them. |
| 30 | Tip | Actively listen and be empathetic. |
| 31 | Tip | Playback what they say. |
| 32 | Tip | When advising, point out how this will lead to innovation and recognition. |
| 33 | Matching Strategy | Expressive Behavior Matching Strategy How to deal with Expressives if you are: An Expressive: You are alike but be careful to not outtalk another expressive or take the credit for achievement. You need to listen better, flatter and take notes. A Driving Style: You need to empathize more, not be afraid of going to the people and feelings level, tolerate storytelling and be comfortable with less structure. You need to loosen up and be more humorous versus being rigid and all business. An Amiable: You share a people orientation and less structure. You differ in that the Expressive in more action oriented and impulsive. You need to worry less about risk and concentrate more on vision and innovation. An Analytical: You are different in every way. First recognize that the Expressive is a risk taker, very decisive and hates too much detail. They want more direct answers and do not care as much about process and accuracy. |

Table 6 shows an example of records in the coaching database 560 that store coaching entries 562 for Amiable behavior.

TABLE 6

Amiable Coaching

| Coaching entry number | Entry Type | Coaching information |
|---|---|---|
| 1 | Tip | Basic Need: To be liked. |
| 2 | Tip | Amiables are about harmony and consensus. |
| 3 | Tip | Relationships are most important to amiables. |
| 4 | Tip | They like to spend time socializing at the beginning of meetings, often intimate questions - e.g. Are you married? Do you have children, where do you live and so on. |
| 5 | Tip | They are simply trying to get to know you personally. |
| 6 | Tip | They communicate at the people and feelings level. |
| 7 | Tip | They most strongly value reliability, loyalty and intimacy. |
| 8 | Tip | Their time frame is the present. They like the comfort of today and resist change. |
| 9 | Tip | Sell them by showing proven processes and brand name references. |
| 10 | Tip | They are not risk takers. |
| 11 | Tip | They are slow to decide. It can be argued that they are rarely deciders, that instead they are approvers because they take the opinions of others before acting. |
| 12 | Tip | They are more unstructured and do not mind storytelling. |
| 13 | Tip | You should answer their questions thoughtfully and more indirectly always thinking of the people impact of your answers. |
| 14 | Tip | They like for presentations to begin with understanding their situation. |
| 15 | Tip | Regarding deals, they like balanced scorecards with guarantees. |
| 16 | Tip | Build rapport by socializing. |
| 17 | Tip | Establish commonalities. |
| 18 | Tip | Be careful not to confront. |
| 19 | Tip | Ask their opinions. |
| 20 | Tip | Be empathetic. |
| 21 | Tip | When advising, point out how this will improve harmony and relationships. |
| 22 | Matching Strategy | Amiable Behavior Matching Strategy How to deal with Amiables if you are: An Amiable. You are alike in every respect. The only conflict is who is most popular and who networks the best. An Analytical. You are alike in that neither of you are risk takers and like more data driven approaches. Also, you both are indecisive. You are different in that the Amiable in more unstructured and people oriented. Understand that Amiables need the support of others to make decisions and do not have the level of detail that you do. A Driving Style: You are opposite in every respect. You should sell to Amiables by selling to those who influence them. You need to slow down and not pressure. Most importantly, you need to learn to socialize more at the intimate level. Also, you need to be empathetic and be comfortable with people and feeling conversations versus task and content. An Expressive: You are alike in your people orientation and the fact that you both are unstructured. You differ in speed of decision making and in taking risks. So do not pressure or expect quick decisions. Sell to those who influence them. |

The agent search program 534 may automatically retrieve one or more of the coaching entries applicable to each external agent or selected actor. For example, if the selected organizational actor has Driver behavior, the agent search program 534 may retrieve and display any desired number of coaching entries 562 specific to individuals with Driver behavior. The coaching display window 564 shows an example of how the tool 500 may display coaching information. Accordingly, the selected external agent receives specific input on how to successfully interact with the selected actor. Furthermore, the agent search program 534 may also search the coaching entries 562 for an applicable behavior matching strategy, and display the particular matching strategy corresponding to the external agent behavior. For example, if the external agent behavior is Expressive and the organizational actor is a Driver, the tool may retrieve and display "You share risk taking, decisiveness and speed with the Driving Style. You differ in that you are less structured and less numbers oriented. Do not use the story telling technique."

Figure 6:
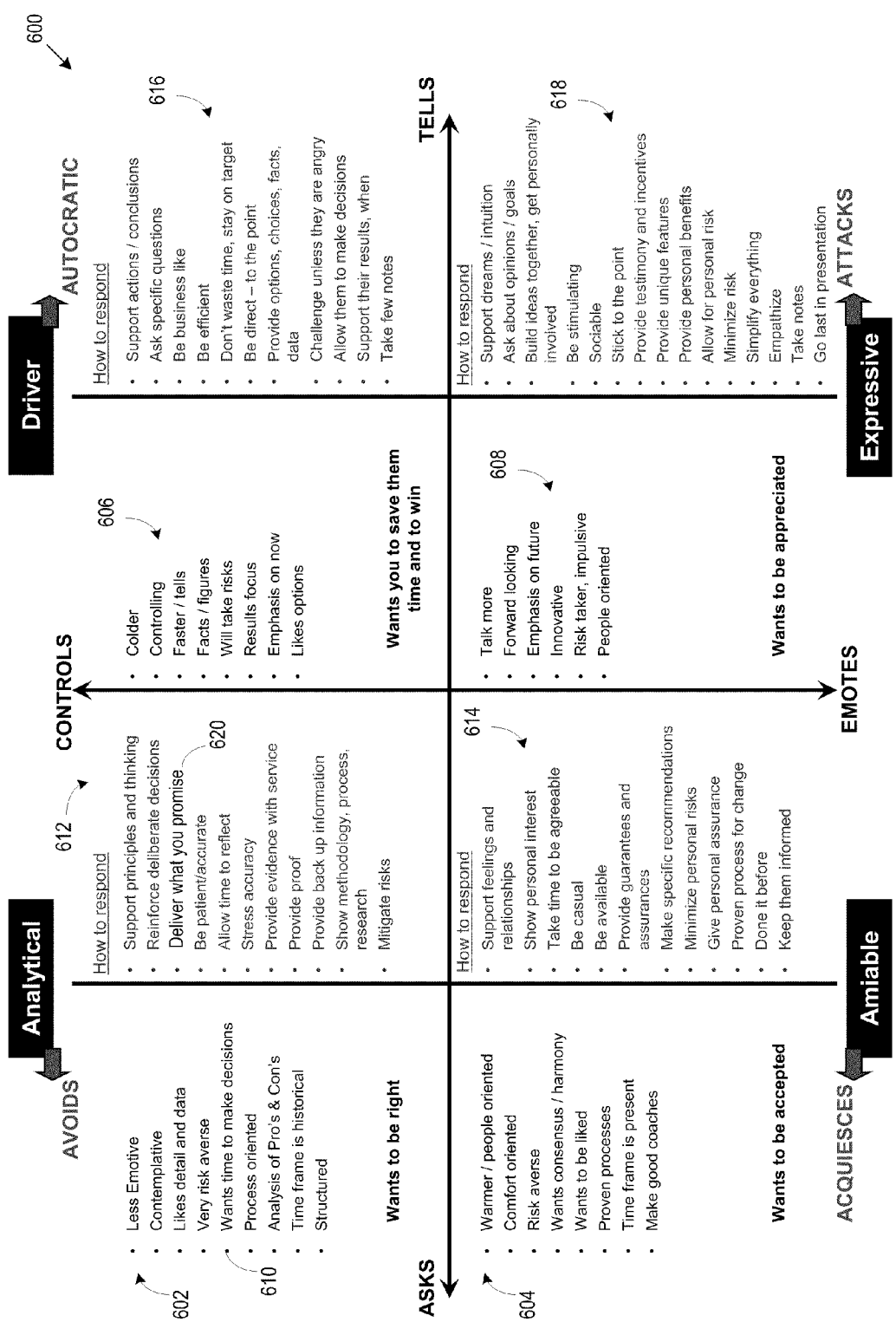
FIG. 6 shows a behavior coaching matrix.

FIG. 6 shows a behavior coaching matrix 600 ("matrix 600"). The matrix 600 provides a behavior description column 602, 604, 606, and 608 for each behavior. For example, the behavior description column 602 provides descriptive entries 610 that characterize the Analytical behavior. The matrix 600 further provides a coaching column 612, 614, 616, and 618 for each behavior. For example, the coaching column 612 provides coaching entries 620 that provide suggestions for how to respond to Analytical behaviors.

The entries in the behavior coaching matrix 600 may be stored as entries in the coaching database 560. Accordingly, in addition to the examples given above in Tables 3-6, the coaching database 560 may store additional or different entries as shown in FIG. 6 (or any other entries). The coaching database 560 implements a source of valuable insight into behavior and may adapt over time to provide the most up-to-date guidance on how external agents should interact with organizational actors.

The behavior mapped influence analysis tool may be implemented in any combination of hardware and software. For example, programs in software libraries may provide the functionality of the mapping program 532 and the agent search program 534. Such software libraries may include dynamic link libraries (DLLs), or other application programming interfaces (APIs). As another example, the databases may be implemented as Microsoft™ Sharepoint™ repositories, Structured Query Language based databases, or in other forms. The programs may be stored on a computer readable medium, such as a CDROM, hard drive, floppy disk, flash memory, or other computer readable medium. Programs, instructions, or other logic may be parts of a single program, separate programs, or distributed across several memories and processors. The programs may also be encoded in a tangible signal of any duration that bears the logic as the signal propagates from a source to a destination.

Furthermore, it is noted that the tool carries out electronic transformation of data that may represent underlying physical objects. For example, the mapping program 532, by selectively creating actor behavior links 552 and actor behavior specifiers 548 effectively transforms physically prepared core influence mappings into behavior influence mappings. Part of the transformation includes adding behavior information to the core influence mapping and linking the behavior information to organizational actors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for behavior mapped influence analysis, comprising:
  defining in computer readable memory an electronic representation of a core influence mapping, the representation of the core influence mapping comprising:
    actor identifiers; and
    actor influence specifiers selectively connecting the actor identifiers and encoding influences between organizational actors identified by the actor identifiers;
  executing from computer readable memory a mapping program comprising program instructions that cause a processor to:
    generate on a user interface a rendering of the core influence mapping that visualizes that the organizational actors influence one another as encoded by the actor influence specifiers;
    accept through the user interface a selection input specifying a selected actor from among the organizational actors;
    display a behavior list comprising permissible behavior tags for the selected actor;
    accept through the user interface a behavior selection from the behavior list; and
    transform the core influence mapping into a behavior influence mapping by:
      creating an actor behavior specifier for the behavior selection in the core influence mapping; and
      creating a behavior link from the selected actor to the actor behavior specifier in the core influence mapping; and executing, from computer readable memory, program instructions that cause the processor to:
        search a coaching database to identify an applicable coaching entry for the actor behavior specifier.

2. The method of claim 1, further comprising:
  executing in computer readable memory an agent search program comprising program instructions that cause a processor to:
    search an agent database to determine agent member identifiers that specify available external agents;
    search the agent database to determine agent behavior specifiers assigned to the available external agents;
    perform a compatibility analysis of the actor behavior specifier for the selected actor with the agent behavior specifiers;
    identify a compatible external agent from among the available external agents to interact with the selected actor, responsive to the compatibility analysis; and
    display the compatible external agent on the user interface.

3. The method of claim 2, where executing program instructions to search the coaching database comprises executing program instructions that cause the processor to:
  search the coaching database to identify an applicable coaching entry matched to the actor behavior specifier and the compatible external agent.

4. The method of claim 2, where executing program instructions to search the coaching database comprises executing program instructions that cause the processor to:
  search the coaching database to identify a matching strategy for the actor behavior specifier and the compatible external agent, the matching strategy comprising coaching information specific to interaction of the compatible external agent with the selected actor linked to the actor behavior specifier.

5. The method of claim 3, where executing program instructions to search the coaching database further comprises executing program instructions that cause the processor to:
  generate a coaching display comprising:
    the selected actor;
    the actor behavior specifier for the selected actor;
    the compatible external agent;
    an agent behavior specifier assigned to the compatible external agent from among the agent behavior specifiers; and
    the applicable coaching entry matched to the actor behavior specifier and the compatible external agent.

6. The method of claim 1, where executing program instructions to search the coaching database comprises executing program instructions that cause the processor to:
  search the coaching database to identify a coaching tip for the actor behavior specifier, the coaching tip comprising behavior characteristics of the actor behavior specifier.

7. The method of claim 1, where executing program instructions to search the coaching database further comprises executing program instructions that cause the processor to:
  generate a coaching display comprising:
    the selected actor;
    the actor behavior specifier for the selected actor; and
    the applicable coaching entry for the actor behavior specifier.

8. An article of manufacture comprising:
  a non-transitory machine readable medium; and
  an electronic representation of a core influence mapping stored on the medium, the representation of the core influence mapping comprising:
    actor identifiers; and
    actor influence specifiers selectively connecting the actor identifiers and encoding influences between organizational actors identified by the actor identifiers;
  a mapping program stored on the medium and comprising program instructions that cause a processor to:
    generate on a user interface a rendering of the core influence mapping that visualizes that the organizational actors influence one another as encoded by the actor influence specifiers;
    accept through the user interface a selection input specifying a selected actor from among the organizational actors;
    display a behavior list comprising permissible behavior tags for the selected actor;
    accept through the user interface a behavior selection from the behavior list; and
    transform the core influence mapping into a behavior influence mapping by:
      creating an actor behavior specifier for the behavior selection in the core influence mapping; and
      creating a behavior link from the selected actor to the actor behavior specifier in the core influence mapping; and
    program instructions that cause the processor to:
      search a coaching database to identify an applicable coaching entry for the actor behavior specifier.

9. The article of manufacture of claim 8, further comprising:
  a agent search program stored on the medium and comprising program instructions that cause a processor to:
    search a agent database to determine agent identifiers that specify available external agents;
    search the agent database to determine agent behavior specifiers assigned to the available external agents;
    perform a compatibility analysis of the actor behavior specifier for the selected actor with the agent behavior specifiers;
    identify a compatible external agent from among the available external agents to interact with the selected actor, responsive to the compatibility analysis; and
    display the compatible external agent on the user interface.

10. The article of manufacture of claim 9, where the program instructions that search the coaching database comprise program instructions that cause the processor to:
  search the coaching database to identify an applicable coaching entry matched to the actor behavior specifier and the compatible external agent.

11. The article of manufacture of claim 9, where the program instructions that search the coaching database comprise program instructions that cause the processor to:
  search the coaching database to identify a matching strategy for the actor behavior specifier and the compatible external agent, the matching strategy comprising coaching information specific to interaction of the compatible external agent with the selected actor linked to the actor behavior specifier.

12. The article of manufacture of claim 10, where the program instructions that search the coaching database further comprise program instructions that cause the processor to:
  generate a coaching display comprising:
    the selected actor;
    the actor behavior specifier for the selected actor;
    the compatible external agent;
    an agent behavior specifier assigned to the compatible external agent from among the agent behavior specifiers; and
    the applicable coaching entry matched to the actor behavior specifier and the compatible external agent.

13. The article of manufacture of claim 8, where the program instructions that search the coaching database comprise program instructions that cause the processor to:
  search the coaching database to identify a coaching tip for the actor behavior specifier, the coaching tip comprising behavior characteristics of the actor behavior specifier.

14. The article of manufacture of claim 8, where the program instructions that search the coaching database further comprise program instructions that cause the processor to:
  generate a coaching display comprising: the selected actor;
  the actor behavior specifier for the selected actor; and
  the applicable coaching entry for the actor behavior specifier.

15. A behavior mapped influence analysis system comprising:
  a processor that executes program instructions;
  a memory in communication with the processor, the memory comprising:
    an electronic representation of a core influence mapping, the representation of the core influence mapping comprising:
      actor identifiers; and
      actor influence specifiers selectively connecting the actor identifiers and encoding influences between organizational actors identified by the actor identifiers;
    a mapping program comprising program instructions that cause the processor to:
      generate on a user interface a rendering of the core influence mapping that visualizes that the organizational actors influence one another as encoded by the actor influence specifiers;
      accept through the user interface a selection input specifying a selected actor from among the organizational actors;
      display a behavior list comprising permissible behavior tags for the selected actor;
      accept through the user interface a behavior selection from the behavior list; and
      transform the core influence mapping into a behavior influence mapping by:
        creating an actor behavior specifier for the behavior selection in the core influence mapping; and creating a behavior link from the selected actor to the actor behavior specifier in the core influence mapping;

program instructions that, when executed, cause the processor to:

search a coaching database to identify an applicable coaching entry for the actor behavior specifier.

16. The system of claim 15, further comprising:

an agent database; and an agent search program stored in the memory and comprising program instructions that cause the processor to:

search the agent database to determine agent identifiers that specify available external agents;

search the agent database to determine agent behavior specifiers assigned to the available external agents;

perform a compatibility analysis of the actor behavior specifier for the selected actor with the agent behavior specifiers;

identify a compatible external agent from among the available external agents to interact with the selected actor, responsive to the compatibility analysis; and display the compatible external agent on the user interface;

where the processor also executes the agent search program.

17. The system of claim 16, where the program instructions that search the coaching database comprise program instructions that cause the processor to:

search the coaching database to identify an applicable coaching entry matched to the actor behavior specifier and the compatible external agent.

18. The system of claim 16, where the program instructions that search the coaching database comprise program instructions that cause the processor to:

search the coaching database to identify a matching strategy for the actor behavior specifier and the compatible external agent, the matching strategy comprising coaching information specific to interaction of the compatible external agent with the selected actor linked to the actor behavior specifier.

19. The system of claim 17, where the program instructions that search the coaching database comprise program instructions that cause the processor to:

generate a coaching display comprising:

the selected actor;

the actor behavior specifier for the selected actor; the compatible external agent;

an agent behavior specifier assigned to the compatible external agent from among the agent behavior specifiers; and the applicable coaching entry matched to the actor behavior specifier and the compatible external agent.

20. The system of claim 15, where the program instructions that search the coaching database comprise program instructions that cause the processor to:

search the coaching database to identify a coaching tip for the actor behavior specifier, the coaching tip comprising behavior characteristics of the actor behavior specifier.

21. The system of claim 15, where the program instructions that search the coaching database comprise program instructions that cause the processor to:

generate a coaching display comprising:

the selected actor;

the actor behavior specifier for the selected actor; and the applicable coaching entry for the actor behavior specifier.

* * * * *